(12) United States Patent
Geisler et al.

(10) Patent No.: US 8,749,350 B2
(45) Date of Patent: Jun. 10, 2014

(54) METHOD OF PROCESSING VEHICLE CRASH DATA

(75) Inventors: Scott P. Geisler, Clarkston, MI (US); Steven C. Tengler, Grosse Pointe Park, MI (US); Richard K. Deering, Clinton Township, MI (US); Catherine L. McCormick, New Boston, MI (US)

(73) Assignees: General Motors LLC, Detroit, MI (US); GM Global Technology Operations LLC, Detroit, MI (US)

( * ) Notice: Subject to any disclaimer, the term of this patent is extended or adjusted under 35 U.S.C. 154(b) by 441 days.

(21) Appl. No.: 12/965,533

(22) Filed: Dec. 10, 2010

(65) Prior Publication Data

US 2012/0146766 A1 Jun. 14, 2012

(51) Int. Cl.
*G08B 5/22* (2006.01)

(52) U.S. Cl.
USPC ......... 340/8.1; 340/436; 340/539.1; 340/988; 701/45

(58) Field of Classification Search
USPC .................. 340/8.1, 436–438, 539.1, 539.13, 340/988–990; 701/45–47; 370/315, 328
See application file for complete search history.

(56) References Cited

U.S. PATENT DOCUMENTS

| | | | | |
|---|---|---|---|---|
| 5,311,197 A * | 5/1994 | Sorden et al. | ................. | 342/457 |
| 5,785,347 A * | 7/1998 | Adolph et al. | ................ | 280/735 |
| 6,732,020 B2 * | 5/2004 | Yamagishi | ........................ | 701/1 |
| 7,044,742 B2 * | 5/2006 | Sumiya et al. | ................ | 434/305 |
| 7,158,016 B2 * | 1/2007 | Cuddihy et al. | ............... | 340/436 |
| 7,197,444 B2 * | 3/2007 | Bomar et al. | ...................... | 703/8 |
| 7,567,169 B2 * | 7/2009 | Dickmann et al. | ............ | 340/436 |
| 2002/0103622 A1 * | 8/2002 | Burge | ........................... | 702/183 |
| 2008/0147267 A1 * | 6/2008 | Plante et al. | ..................... | 701/35 |
| 2009/0023425 A1 * | 1/2009 | Hosain et al. | ............. | 455/412.1 |
| 2009/0132128 A1 * | 5/2009 | Marriott et al. | ................. | 701/45 |
| 2009/0207007 A1 * | 8/2009 | Flick et al. | ..................... | 340/436 |
| 2009/0233631 A1 * | 9/2009 | Butler et al. | .................. | 455/466 |
| 2010/0332069 A1 * | 12/2010 | Tippy | .............................. | 701/29 |

* cited by examiner

*Primary Examiner* — Mohammad Ghayour
*Assistant Examiner* — Nay Tun
(74) *Attorney, Agent, or Firm* — Anthony Luke Simon; Reising Ethington P.C.

(57) ABSTRACT

A method of processing vehicle crash data includes the steps of receiving vehicle data obtained at a vehicle during a vehicle crash, determining the identity of the vehicle, estimating the severity of the vehicle crash using the determined vehicle identity and the received vehicle data, and providing the estimated severity to an emergency responder.

7 Claims, 4 Drawing Sheets

CDS Cases Search Criteria                         http://www-nass.nhtsa.dot.gov/nass/cds-new/SearchForm.aspx

Select a Single Case

Case ID: [_____]          OR          Case Year: [2008] PSU [2]   Case Number:
[GET CASE ▷]                                      [_____] [GET CASE ▷]

Select From a List of Cases Based on Criteria Below
Crash Criteria Items

Search Criteria: [SAVE ☐] [LOAD ☐]
[RESET CRITERIA ☐] [SEARCH ▷]                     [_____] Browse...

Crash Date:  Year: [All]   Month: [All]    Number of  Min: [All]   Max: [All]
                                           Vehicles:
Mortality/Injury  [All]
Severity:

Vehicle
Make:       [All]
                                           Start
Model:      [All]                          Model      [All]
                                           Year:
Body        [All]                          End Model  [All]
Category:                                  Year:

Vehicle Damage
Primary:    [All]                          PDOF:    [__] to [__] degrees
Secondary:  [All]                          Delta v: [__] to [__] ● mph  ○ kmph
                                           Barrier
                                           Equivalent [__] to [__] ○ mph  ● kmph
                                           Speed:
                                           Rollover:  ☐

Occupant
Age:           [__] to [__]  ○ Months ● Years    Sex:     [All]
Seat Position: [All]                             Height:  [__] to [__] cm
                                                 Weight:  [__] to [__] kg

Injury
Body Region:   [All]                             AIS/NASS  [_____]
                                                 Code:
                                                 Maximum
                                                 AIS:      [__] to [__]
                                                 ISS:      [__] to [__]

Restraint Use
Manual Belt    [All]                             Air Bag      [All]
Available:                                       Available:
                                                 Air Bag      [All]
                                                 Location:
Automatic Belt [All]                             Air Bag      [All]
Available:                                       Deployed:
                                                 Child Seat   [All]
                                                 Used:

[RESET CRITERIA ☐] [SEARCH ▷]
Please Send Comments and Report Errors to NCSAweb@dot.gov

*FIG. 3*

| 402 | ⧄ | Ultra High Strength Steel |
| 404 | ⧄ | Airbag |
| 406 | ⧄ | High Voltage |

METHOD OF PROCESSING VEHICLE CRASH DATA

TECHNICAL FIELD

The present invention relates generally to vehicles and more specifically to processing vehicle data that is generated during a vehicle crash.

BACKGROUND OF THE INVENTION

Vehicles are widely used for transportation purposes. They carry people and cargo over differing terrain in a variety of conditions. Unfortunately, in the process of performing their function, vehicles may be involved in a collision or crash. Often, public safety personnel, such as emergency responders, are called on to assist vehicle occupants when a crash occurs. However, the severity of vehicle crashes can vary from low speed collisions to crashes involving much more speed and force. And before emergency responders arrive on the scene, they may not know whether the vehicle collision is best described by the former situation or the latter. Even if the emergency responders have information relating to the vehicle crash it may be incomplete or inaccurate. Therefore, it may be helpful to provide additional information relating to the vehicle collision and supply that information to emergency responders before they arrive at the crash site.

SUMMARY OF THE INVENTION

According to an embodiment of the invention, there is provided a method of processing vehicle collision data. The method includes the steps of receiving vehicle data obtained at a vehicle during a vehicle crash, determining the identity of the vehicle, estimating the severity of the vehicle crash using the determined vehicle identity and the received vehicle data, and providing the estimated severity to an emergency responder.

According to another embodiment of the invention, there is provided a method of processing vehicle collision data. The method includes the steps of receiving data from a vehicle telematics unit indicating that a vehicle has been involved in a collision, identifying the vehicle based on the received data, accessing previously-stored vehicle crash data based on the identified vehicle, comparing the accessed vehicle crash data with the received data, determining a severity rating of the collision based on the comparison, and providing the severity rating to an emergency responder.

According to yet another embodiment of the invention, there is provided a method of processing vehicle collision data. The method includes the steps of detecting a vehicle crash in a vehicle, sending vehicle data obtained during the vehicle crash to a call center, determining the identity of the vehicle, estimating the severity of the vehicle crash based on the vehicle identity and the sent vehicle data, identifying supplemental vehicle information based on the vehicle identity or the severity of the vehicle crash, and sending the supplemental vehicle information to an emergency responder.

BRIEF DESCRIPTION OF THE DRAWINGS

One or more preferred exemplary embodiments of the invention will hereinafter be described in conjunction with the appended drawings, wherein like designations denote like elements, and wherein:

FIG. 3 is a screen shot of a National Automotive Sampling System (NASS) Crashworthiness Data System (CDS) website.

DETAILED DESCRIPTION OF THE PREFERRED EMBODIMENT(S)

Described below are vehicle crash data processing methods that include using information generated during a vehicle collision in conjunction with technical design information pertaining to a vehicle to create an estimation or description of the crash severity that can be sent to emergency responders. The words crash and collision are used interchangeably herein. Vehicle crash data can be gathered from the vehicle in the moments before, during, and after the collision and analyzed to estimate the severity of the vehicle crash. In addition to information that indicates the severity of the crash, the vehicle crash data can also include the location of the vehicle and/or information relating to the location of unique components/systems that may impact incident response and/or occupant extrication. The severity of the vehicle crash can be calculated and information relating to unique vehicle systems/components can be identified using the vehicle make, model, and/or year of manufacture, which can be included with the vehicle crash data. The analysis of this data can be vehicle-specific, using the model and/or year of the vehicle to access technical design information specific to the vehicle involved in the crash. The types of vehicle crash data and the manner in which it is processed will be described below in greater detail.

After analysis has been performed on at least part of the vehicle crash data, the data and/or analysis can be passed on to emergency responders (e.g. first responders) or an emergency advisor that can assist both vehicle occupants and emergency responders during the crash. By providing the vehicle crash data or analysis to emergency responders, it is possible to reduce the amount of time emergency responders spend at the crash site analyzing the damage and/or injuries sustained by the vehicle and/or the occupants. As a result, the emergency responders can begin to help much sooner than if they did not have the vehicle crash data and also ensure that they carry equipment appropriate to assist. Furthermore, vehicle occupants in a vehicle crash may lack external wounds that correspond to the seriousness of the crash. In those cases, emergency responders may underestimate the seriousness of a collision based on the lack of visible injuries. Or in other words, a vehicle occupant who has been involved in a crash may appear uninjured yet still have internal injuries that require swift attention. Providing vehicle crash data to emergency responders can help identify serious vehicle collisions, which may result in non-obvious injuries to vehicle occupants. The vehicle crash data can also minimize response delay and alert the emergency responders to components/systems unique to a particular vehicle. These methods will be described in more detail below.

Figure 1:
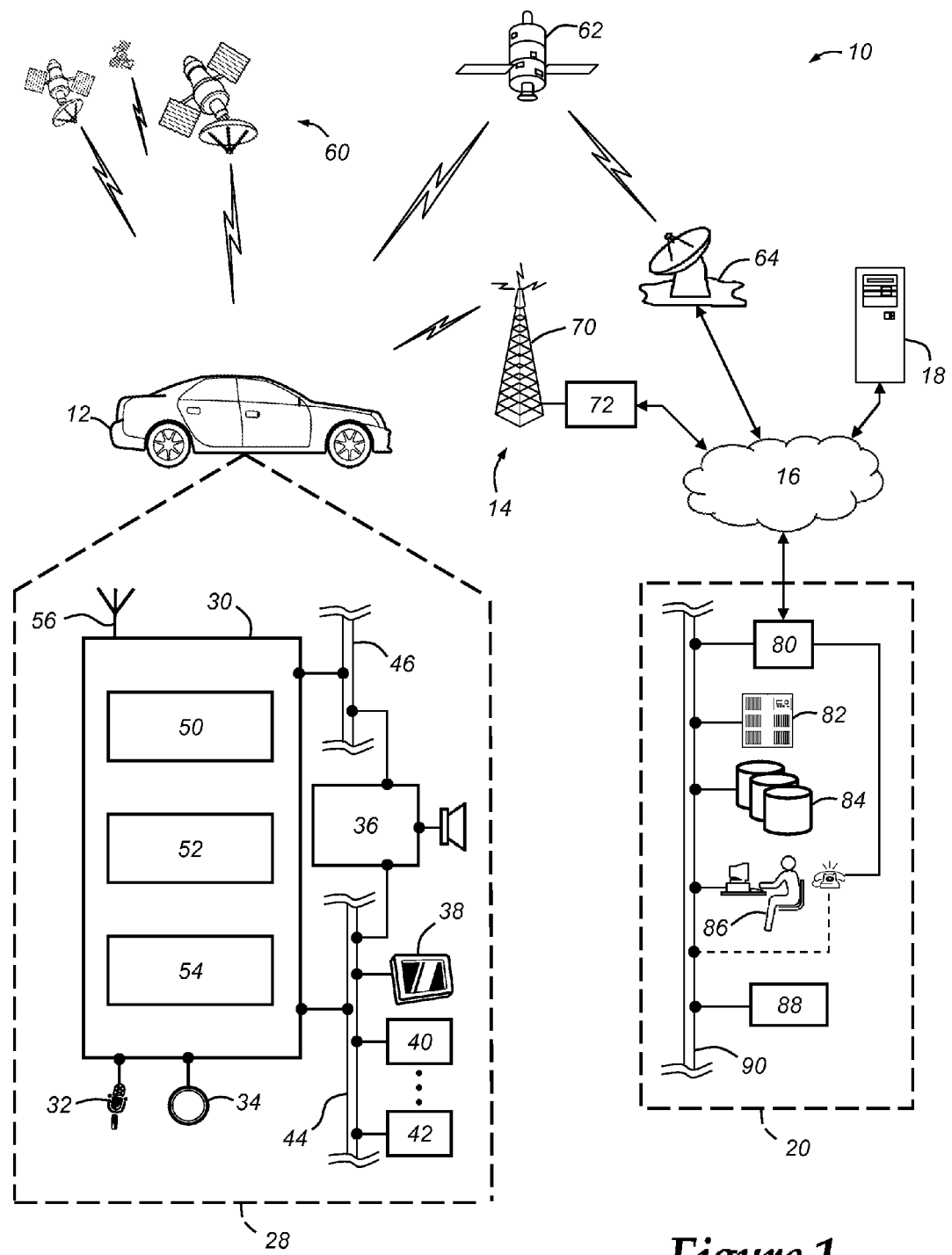
FIG. 1 is a block diagram depicting an exemplary embodiment of a communications system that is capable of using the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a cellular call (a voice channel and/or a data channel) with wireless carrier system 14 so that voice and/or data transmissions can be sent and received over the call. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a vocoder, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GSM, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. VSM 42 can also be a crash detection module and/or comprise one or more vehicle sensors that are capable of detecting a vehicle crash. In one example, a vehicle sensor capable of detecting a vehicle crash can be an accelerometer or other device capable of sensing change in vehicle motion and/or direction. However, other sensors are possible. Vehicle sensors that are capable of detecting a vehicle crash can be included in the vehicle electronics 28 to provide vehicle crash detection information to the telematics unit 30. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using a voice or packet-switched data connection, telematics unit 30 can use SMS to send and receive data. Also, apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30 (e.g. a data center); a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. The call center 20 is given as one example of a central facility and it should be appreciated that other implementations are possible. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
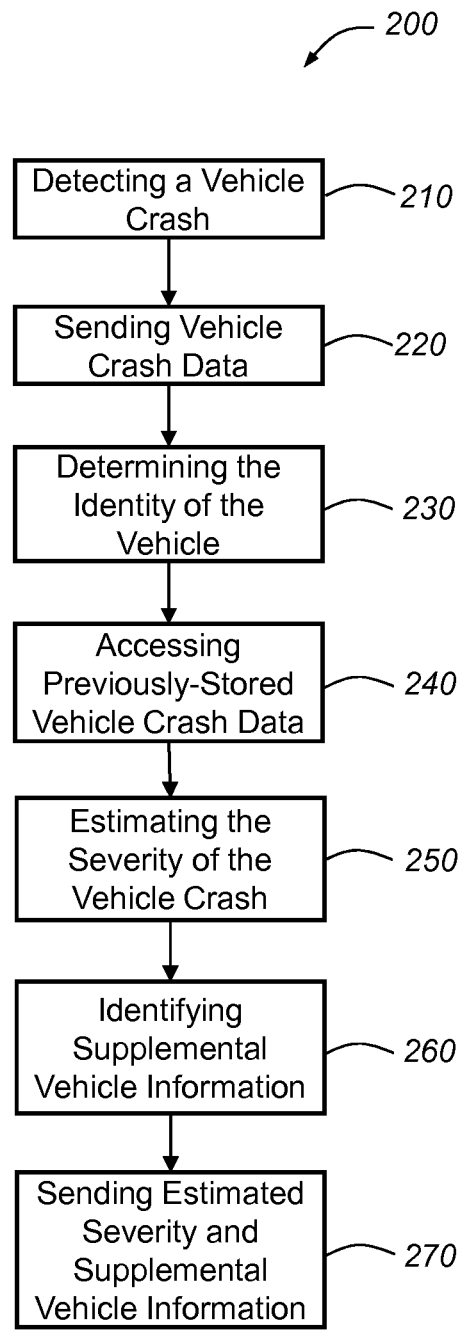
FIG. 2 is a flow chart of a method of processing vehicle collision data.

Turning now to FIG. 2, there is an exemplary method 200 of processing vehicle crash data. The method 200 begins at step 210 with detecting a vehicle crash in a vehicle. This can involve the use of one or more sensors, such as those previously-described as providing input to VSM 42, that indicate that the vehicle 12 has been involved in a collision. For instance, these sensors can detect one or more vehicle events that occur during a crash. Such events include airbag activation, a change in vehicle velocity or acceleration/deceleration larger than a predetermined threshold, or detecting a vehicle rollover to name a few. Once the sensor and/or VSM 42 has received input indicating a vehicle crash has occurred, this input can be sent via the vehicle bus 44 to the telematics unit 30. There, the telematics unit 30 can interpret one or more inputs received from the sensor and determine if a vehicle crash has occurred. Alternatively, the determination that a collision occurred can be made at the crash module VSM 42 and a notification of such sent to the telematics unit 30. The method 200 proceeds to step 220.

At step 220, vehicle crash data gathered during the vehicle crash is sent from the vehicle 12. After determining that a vehicle crash has occurred, vehicle data obtained before, during, and after the crash can be preserved and will be generally referred to as vehicle crash data. This means that data representing vehicle motion and operation can be continuously gathered and when a collision occurs, the data before, during, and after the crash can be identified and preserved. This vehicle crash data can be identified as Advanced Automatic Collision Notification (AACN) or Automatic Crash Response (ACR) data. ACR data can include vehicle telemetry that is sent from the vehicle 12 when a vehicle is involved in a crash. Examples of ACR data include information indicating the area of the vehicle impacted and the direction and force of that impact. To explain further, the ACR data can indicate that the rear of the vehicle was impacted from a direction directly behind the vehicle 12 and include an amount of force associated with that impact. Other examples of ACR data include change in velocity data (delta V), information that identifies the number of vehicle occupants, the number of those occupants that wore seatbelts at the time of the vehicle crash, an indication if the vehicle airbags have deployed, or whether the vehicle 12 has rolled over. These are but some examples of ACR data and it will be appreciated by those skilled in the art that the ACR data used by the method 200 can include other useful data. The vehicle crash data can also include or be accompanied by vehicle location information. This information can include GPS coordinates corresponding to the location of the vehicle 12. The method 200 proceeds to step 230.

At step 230, the identity of the vehicle is determined. As well as the information described above, the ACR data can also or alternatively include information that identifies and/or describes the vehicle 12. In one example, this means that the ACR data can incorporate vehicle identity information, such as the vehicle model, the manufacturer of the vehicle, and the year of manufacture. In another example, the ACR data can include a unique identifier, such as a vehicle identification number (VIN), electronic serial number (ESN), or station identification number (STID) to name a few. The unique identifier can be used at a location outside of the vehicle, such as the call center 20, to retrieve telematics subscriber information. That is, the unique identifier can be used to reference or gain access to the vehicle model, manufacturer, and year of manufacture or other personal data belonging to the telematics subscriber. In yet another example, the call center 20 can identify the telephone number of an incoming call and use that identification to determine the vehicle model, the manufacturer of the vehicle, and the year of manufacture of the vehicle in the crash. Regardless of whether identifying information, such as the vehicle model, the manufacturer of the vehicle, and the year of manufacturer, is sent with the ACR data from the vehicle 12 or accessed outside of the vehicle 12, the identifying information, the unique identifier, or the telephone number can be leveraged to identify specific vehicle components installed on the vehicle 12 involved in the crash. This will be described in more detail below. The method 200 proceeds to step 240.

At step 240, previously-stored vehicle crash data may be accessed based on the vehicle crash data sent in step 220 and/or the determined vehicle identity in step 230. One or more databases contain detailed data describing vehicle collisions that occurred in the past and include many vehicle manufacturers, models, and model years. This data can be described as previously-stored vehicle crash data. An example of one of these databases is the National Automotive Sampling System (NASS), which is maintained by the National Highway Traffic Safety Administration (NHTSA) and includes a Crashworthiness Data System (CDS). The CDS includes detailed data from thousands of vehicle collisions ranging in severity from minor to fatal. Field research teams employed by NHTSA study about 5,000 crashes a year involving passenger cars, light trucks, vans, and utility vehicles. Trained crash investigators obtain data from crash sites, studying evidence such as skid marks, fluid spills, broken glass, and bent guard rails. They locate the vehicles involved, photograph them, measure the crash damage, and identify interior locations that were struck by the occupants. These researchers can follow up on their on-site investigations by interviewing crash victims and reviewing medical records to determine the nature and severity of injuries. The research teams can use the information they obtain to help understand the nature and consequences of vehicle crashes.

After gathering the data and entering it into the CDS, that data can be made available to researchers and other third parties, such as telematics service providers. The vehicle crash data can be provided by the CDS in a variety of ways, such as via Extensible Markup Language (XML) files. The XML files that include previously-stored vehicle crash data can be sent to the computer 18 (e.g. a data center), to the call center 20, or the call center 20 can receive the files from the CDS through the computer 18. The types of data provided and/or collected by the CDS can be appreciated from FIG. 3, which shows a screen shot of a webpage belonging to the CDS. The webpage shown in FIG. 3 can accept one or more variables and output previously-stored data that corresponds to the inputted variables. So in that sense, at least some of the vehicle crash data can be used to search the CDS database to locate previous collisions that may be similar to the present crash. Many combinations of inputted data are possible. As an example, using some of the possible variables shown in FIG. 3, the CDS could be queried with the vehicle make, model, and model year. If the vehicle crash data includes other data, such as the primary direction of force (PDOF), the change in velocity (delta V), or the body category (e.g. location) impacted, it can be used in the query as well. After submitting the vehicle crash data to the CDS, it can output data describing previous vehicle collisions similar to the crash that just occurred. This output data can include a variety of information, such as the severity and location of injuries sustained by each vehicle occupant in the previous vehicle crash or any other data variables shown in FIG. 3. The method 200 proceeds to step 250

At step 250, the severity of the vehicle crash is estimated using a number of different combinations of available data. The severity of the vehicle crash can be estimated using any combination of sent vehicle crash data, previously-stored crash data, and/or vehicle or model-specific information that can describe how that vehicle may react to a wide range of vehicle collisions. Model-specific information can include vehicle design data—such as information gathered by engineers during the design and testing of a particular model—that can predict how a vehicle model may react in a vehicle crash. Vehicle-specific information can include that obtained from manufacturing or service bay history records that indicate any relevant non-standard vehicle information that differs from the base model for the vehicle. For example, if a customer purchased a non-standard cabin for a pick-up truck that added mass, that may influence the vehicle crash severity determination. Such information can be maintained in a separate database and accessed and included in the severity calculation. These types of data can be obtained using modeling software, as is known. In another example, the severity of the vehicle crash can estimated using the previously-stored crash data and the sent vehicle crash data. Estimating the severity may involve comparing the previously-stored crash data with the vehicle crash data and determining the severity based on that comparison. That is, the vehicle crash data can be used to determine a relative ranking of vehicle crash severity with respect to occupant injury and/or vehicle damage. This can be accomplished in a variety of ways. For example, the vehicle crash data can be received at the computer 18 (e.g. data center) and/or call center 20. There, one or more variables of the vehicle crash data can be used to estimate vehicle crash severity in real-time. In one instance, the vehicle crash severity can be described as a function of the primary direction of force (PDOF), the Delta V of the crash, determining that a roll-over has occurred, and determining the airbag status. In another example, vehicle crash data can be received at the computer 18 (e.g. data center) and/or call center 20, where it can be submitted to a database, such as the CDS, and the severity of the crash can be determined by identifying the severity of past crashes similar to the present crash, which have been output from the CDS. In other words, based on the vehicle crash data, the CDS can compare that data to similar crashes and help provide an estimation of the severity/location of the injuries to the occupants and/or the damage to the vehicle. The vehicle crash data can be received at the computer 18 (e.g. data center) and/or call center 20.

The processing of vehicle crash data described above can involve comparing the values received as vehicle crash data with predefined crash thresholds. The predefined crash thresholds can be values associated with crashes that occurred in the past, such as can be provided by the CDS. For example, one predefined crash threshold for a particular vehicle 12 can be established as 10 miles per hour (MPH)—a value below which can be considered a minor crash based on previously-stored vehicle crash data. If the vehicle 12 transmits vehicle crash data for a particular vehicle 12 that includes a delta V of 5 MPH, the computer 18 or call center 20 can receive the vehicle crash data, determine the delta V of that data is below the 10 MPH threshold, and estimate that the severity of the vehicle crash is minor or "low." Similarly, given that the severity estimate when the delta V is below 10 MPH has been described as "low," other categories can be established based on previously-stored vehicle crash data for increasing values of delta V. For instance, if delta V is above 10 MPH but below 30 MPH, the estimate could describe the severity of the vehicle crash as "moderate," while delta V values above 30 MPH can be described as "severe." The predefined thresholds can be broken down further into separate thresholds for vehicle damage and for vehicle occupant injury or can be established as a general threshold. It should be appreciated that methods other than "low," "medium," and "severe" can be used for estimating vehicle crash severity. As one example, vehicle crash severity could be ranked on a scale of 1-10 (or 1-5 or other range of values) in such a way that 1 represents the least severe crash while 10 represents the most severe crash. Also, while the above example estimates vehicle crash severity using one variable, this has been described using one variable for purposes of illustration. It should be appreciated that the severity of the vehicle crash can be calculated using two or more variables and the thresholds that are used to estimate severity can be modified to reflect additional variables. For example, using the delta V example above, if the analysis included vehicle crash data that indicated whether a vehicle rollover occurred, the estimation thresholds for delta V could change. That is, if a collision generates vehicle crash data having a delta V of between 10-30 MPH—which would be estimated as "moderate" in the above example—and includes data that indicates a rollover occurred, it could be estimated as "severe" instead. The addition of the rollover detection could make the crash more serious depending on what the previously-stored crash data reflects. So, the addition/subtraction of variables can alter the estimated outcome. The method 200 proceeds to step 260.

At step 260, supplemental vehicle information is identified based on the vehicle identity or the estimated severity of the vehicle crash. Supplemental vehicle information can be vehicle systems/components that impede emergency responders from assisting with a vehicle crash or can involve technology that benefits from special treatment during vehicle collisions. As an example, if the identity of the vehicle 12 indicates that the vehicle 12 is a hybrid-electric vehicle, then instructions for handling the hybrid-electric vehicle can be accessed and provided to first responders in a form they can understand before they arrive at the scene of a crash. These instructions can include the location of the battery shut-off switch, high-voltage precautions, or other relevant information. In another example, the vehicle 12 could be manufactured with sections of high-strength steel. Therefore, if the identity of the vehicle 12 indicates that the vehicle 12 includes areas of high-strength steel and that extrication of vehicle occupants is needed, then the location of the high-strength steel can be provided to emergency responders along with instructions regarding how to avoid or penetrate this steel.

It is also envisioned that different supplemental information can be provided based on the estimated severity of the vehicle crash. For instance, using the example of high-strength steel above, vehicle crashes that are estimated as "severe" can trigger providing emergency responders the locations of high-strength steel while vehicle crashes estimated as "low" can omit these locations. That way, the emergency responders can be supplied with only information that is highly-relevant to the vehicle crash and do not have to sort through inapplicable information. The method 200 proceeds to step 270.

At step 270, the estimated severity of the vehicle crash and the supplemental vehicle information is sent to an emergency responder. Once vehicle crash severity has been estimated and supplemental vehicle information has been identified and obtained, either or both can be sent to the emergency responder. This information can be provided to the emergency responder in a variety of ways that can more clearly convey it. For example, the estimated severity or supplemental vehicle information can be sent from the call center 20 to a Public Safety Access Point (PSAP), which can then provide it to emergency responders at the scene of the crash. In another example, the estimated severity or supplemental vehicle information can be sent from the call center 20 directly to the emergency responders. In either case, a live advisor located at the call center 20 can oversee the communication of information with the emergency responders. In some implementations, the live advisor can be specially-designated as an emergency advisor having specialized training, responsibilities, or equipment.

Figure 4:
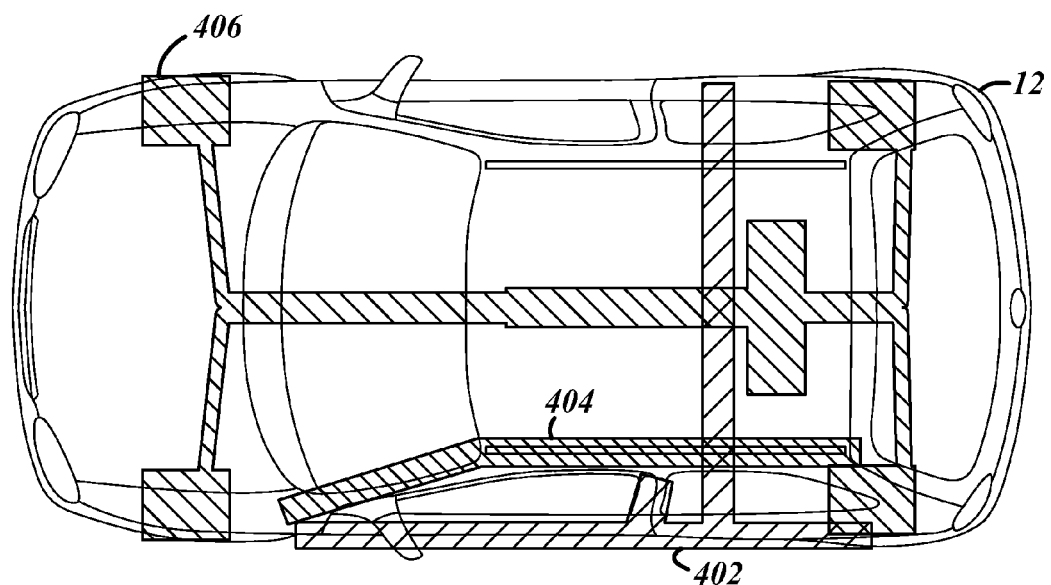
FIG. 4 is a graphic display depicting a plan view of the vehicle.

The manner in which the estimated vehicle severity and/or supplemental vehicle information is provided to a PSAP or emergency responders can take a number of forms. For instance, this information can be displayed graphically to the PSAP or emergency responders. The graphic display can be received and viewed by emergency responders using wireless devices, either hand-held or located/mounted in a vehicle. The graphic display can be also or alternatively displayed at the PSAP. An example of a graphic display is shown in FIG. 4, which includes a plan view of the vehicle 12. The plan view can be overlaid by a plurality of shaded sections that each identify and locate a particular vehicle component or system. As shown in FIG. 4, the location of ultra-high strength steel 402, airbags, 404, and high-voltage components 406 are shown as shaded areas that correspond to the location of those components on the vehicle 12. It is also possible to indicate the number of vehicle occupants, the seating position of each vehicle occupant, and whether each vehicle occupant was seat belted at the time of the vehicle crash. While the plan view of the vehicle 12 is shown, it should be appreciated that other vantage points can be used, such as perspective and side views. Also, the shaded areas shown over areas of the vehicle can each be denoted by a different color, which may help draw distinctions between different components. In one example, the ultra-high strength steel can be shaded blue, the airbag locations can be shaded red, and the high-voltage components can be shaded yellow. The graphical display can also identify the model, manufacturer of the vehicle 12, and the year of vehicle manufacture. Other information can be included with the graphical display, such as date, time, and location of the crash. In that sense, the vehicle crash data can include the last-recorded GPS coordinates of the vehicle 12 and the call center 20 can generate a map of this location with the position of the vehicle 12 superimposed on the map. The generated map and vehicle position can then be sent to the PSAP and/or the emergency responders. In some cases, vehicle collisions involve vehicles that have left the roadway or otherwise may not be easily located by emergency responders. This way, the emergency responders can locate the vehicle with respect to landmarks on the map. The method 200 then ends.

The invention claimed is:

1. A method of processing vehicle crash data, comprising the steps of:
  (a) wirelessly receiving at a call center vehicle data obtained from one or more vehicle modules at a vehicle during a vehicle crash;
  (b) determining the identity of the vehicle at the call center using one or more databases;
  (c) estimating the severity of the vehicle crash using the determined vehicle identity and the received vehicle data, wherein the estimating step is at least partly carried out using the call center or a computer;
  (d) graphically-depicting the estimated severity of the vehicle crash on a wireless device used by an emergency responder via a plurality of shaded sections that each identify and locate a particular vehicle component, wherein each of at least some shaded sections are denoted with a different color.

2. The method of claim 1, wherein the vehicle data further comprises any one or more of: a primary direction of force, a change in vehicle velocity, an occurrence of a vehicle rollover, a detection of multiple impacts, an activation of a vehicle airbag, or a presence of an unbelted occupant.

3. The method of claim 1, wherein the step (b) further comprises determining a phone number associated with the vehicle and obtaining the identity of a vehicle manufacturer, the identity of a vehicle model, and the identity of a vehicle model year based on the phone number.

4. The method of claim 1, wherein the identity of the vehicle further comprises a unique identification number.

5. The method of claim 1, further comprising the step of calculating a severity rating of the vehicle crash.

6. The method of claim 1, wherein the graphic depiction further comprises one or more colored sections, each of which indicate an amount of damage to the vehicle.

7. The method of claim 1, wherein step (d) further comprises communicating the estimated severity to the emergency responder via a packet-switched communication network.

* * * * *